Figure 1:
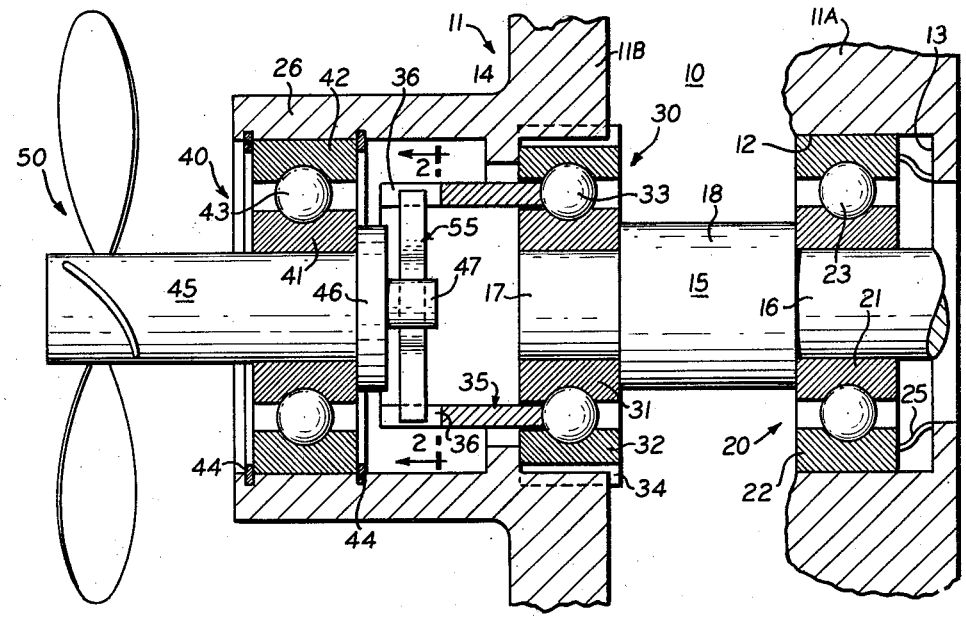

Aug. 18, 1964  E. M. LADIN  3,144,789

HIGH TORQUE PLANETARY DRIVE

Filed July 18, 1962

INVENTOR
ELI M. LADEN

BY
*Blum, Moscovitz,*
*Friedman & Blum*

ATTORNEYS.

United States Patent Office 3,144,789
Patented Aug. 18, 1964

3,144,789
HIGH TORQUE PLANETARY DRIVE
Eli M. Ladin, 4 Bobwhite Drive, Norwalk, Conn.
Filed July 18, 1962, Ser. No. 210,733
2 Claims. (Cl. 74—798)

This invention relates to high torque drives and, more particularly, to an improved high torque drive of the planetary type incorporating shock absorbing and torque limiting means.

In industrial fan applications, it is desirable to move the largest volume of air with a given horsepower drive for the fan. This can be achieved either by increasing the rotational speed of a given size fan or propeller or by increasing the pitch angle of the blades so as to "bite" more air.

Increasing the rotational speed is usually objectionable because of the noise level associated with high speed fans. Thus, the increase in the pitch angle of the blades is usually the preferred way to increase air flow. However, with an increased pitch angle of the blades, a greater torque is required to drive the fan.

The increase torque is obtained by reducing the speed of the fan while maintaining the power input constant. The speed reduction is usually effected with pulleys or gears. Thus, a pulley on the output shaft of an electric motor revolving at a speed of, for example, 1125 r.p.m., will drive, through a belt drive, a larger pulley mounted on a fan axle at a speed of, for example, 400 r.p.m. Such belt drives, while effective to accomplish the desired purpose, have disadvantages from the standpoint of compactness and required installation space, as well as from the standpoint of maintenance and repair of the belts.

In accordance with the present invention, these disadvantages are obviated by providing a speed reduction gearing including an antifriction bearing assembly acting as a planetary gearing, and further including novel torque-absorbing and torque-responsive release means associated with such planetary gearing.

An antifriction bearing assembly has the geometry of a planetary system. Thus, the inner race corresponds to the sun gear, the outer race corresponds to the ring gear, and the rolling elements, either balls or roller bearings, are the planets, with the bearing cage or separator constituting the planetary member of the assembly. However, such an antifriction bearing assembly does not constitute a positive gearing arrangement in the same nature as does a planetary system involving intermeshing gear elements. In order for an antifriction bearing to act as a planetary system, axial thrust must be applied thereto to provide a good frictional engagement between the several elements. Then, when one element, for example the outer race, is held stationary and another element, such as the inner race, is driven, the cage or separator will provide an output which has a reduced speed with respect to the speed of the driving or inner race member. The effective output speed can be controlled over a relatively wide range by varying the amount of axial pressure exerted on the antifriction bearing assembly. This correspondingly varies the frictional engagement between the elements and thus the relative positiveness of the drive. The effect of the actual thrust can be enhanced if, for example, the bearing rings or races have frusto conical surfaces or, when roller bearings are used, if the latter are tapered.

However, if such an antifriction bearing is used as a planetary arrangement for providing a reduced speed drive for a fan, the high torque applied during starting of the fan will result in slippage of the bearing elements and thus undue wear thereon. Accordingly, and in further accordance with the invention, a torque-responsive coupling is provided between the output of the planetary gearing system, involving an antifriction bearing assembly, and the fan to be driven. Thus, for example, if the driving motor is connected to the inner race of the antifriction assembly and the fan is to be driven from the cage or separator of the assembly, a torque-responsive coupling is provided between the separator and the shaft of the fan.

One relatively simple and effective way of doing this is to provide a slot in the fan shaft and to provide a pair of diametrically aligned slots in the separator. A suitable relatively elongated resilient element is then engaged in the slots and is so designed that it will provide a resilient coupling between the cage and the fan which will yield to some extent upon starting of the fan. As a further feature of the invention, this resilient member is so designed that, upon the torque exceeding a predetermined value, the connection between the separator and the fan shaft is made ineffective until such time as the torque has been reduced to a pre-set value. While a preferred form of such coupling element is a leaf spring having certain curvatures imparted thereto, the coupling can also comprise a resilient rod or a resilient tube.

Figure 2:
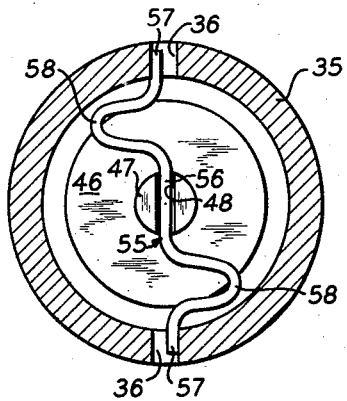

For an understanding of the principles of the invention, reference is made to the following description of a typical embodiment thereof as illustrated in the accompanying drawing. In the drawing:

FIG. 1 is an axial sectional view through a fan drive embodying the invention; and FIG. 2 is a diametric sectional view taken on the line 2—2 of FIG. 1.

Referring to the drawing, the invention is seen as embodied as a fan drive including a motor 10 having a housing or casing 11 of which only parts 11A and 11B are show fragmentarily in the drawing. The output shaft of motor 10 is fragmentarily indicated at 15 as having a pair of axially spaced relatively small diameter sections 16 and 17 between which is an enlarged section 18 forming, with the sections 16 and 17, diametrically extending shoulders. Housing portion 11A is formed with an outwardly opening substantially cylindrical annular recess 12 in which is seated an antifriction bearing, such as a ball bearing 20. Ball bearing 20 has an inner race 21 secured on reduced portion 16 of shaft 15, and an outer race 22 seated in recess 12. Ball elements 23 are disposed between and guided by races 21 and 22. Inner race 21 is seated firmly against the shoulder formed at the junction of portions 16 and 18 of shaft 15. For a purpose to described, a thrust spring 25 is disposed between outer race 22 and the inner annular surface 13 of the recess 12.

The outer reduced end 17 of shaft 15 has a driving engagement with the inner race 31 of an antifriction bearing 30 acting as a planetary gearing and shown, for exemplary purposes, as a ball bearing. The outer race 32 of bearing 30 is seated against an internal rib 14 in housing section 11B. Rib 14 limits axial displacement of the bearing 30 under the influence of the thrust spring 25. Outer race 32 is suitably fixed against rotation in housing section 11B, as by having a key portion 34 interengaged in suitable slots in housing portion 11B. Balls or ball elements 33 are disposed between and guided by inner race 31 and outer race 32, although it should be understood that balls 33 could be replaced by roller bearings, for example of the tapered type. Also, the facing surfaces of the inner and outer races could be tapered in such a manner as to converge outwardly relative to shaft 15.

It will be noted that inner race 31 is constrained to rotate with the shaft 15, and outer race 32 is held stationary in housing portion 11B. A cage or separator 35 is provided for balls 33 and projects axially forwardly from bearing assembly 30. For a purpose to be described, the outer end of the generally tubular separator 35 is formed with a pair of diametrically opposed and axially extending slots 36.

Housing section 11B has a tubular extension 26 into which separator 35 projects. The outer end of extension 26 has mounted therein an antifriction bearing assembly 40 for a fan 50. Bearing assembly 40 is illustrated, by way of example, as a ball bearing including an inner race 41, an outer race 42 and balls 43 which are retained and guided by the races 41 and 42. A pair of retainer springs 44, disposed on either side of outer race 42 and interlocked in grooves in the inner surface of extension 26, retain outer race 42 against axial displacement relative to extension 26.

Bearing assembly 40 serves to mount a fan 50, which has a shaft 45 secured to rotate with inner race 41 of bearing assembly 40. Shaft 45 extends completely through inner race 41 and has a collar or enlarged portion 46 in engagement with the inner end surface of the inner race. Extending inwardly from this collar 46 there is a reduced diameter portion 47 formed with a diametrically extending slot 48, as best seen in FIG. 2.

Shaft 45 is coupled for driving by separator 35 of bearing assembly 30 by means of a reslient coupling element 55 which is arranged to automatically uncouple shaft 45 from bearing assembly 30 upon occurrence of a torque in excess of a predetermined value. In the particular embodiment shown in the drawing, resilient coupling 50 comprises a leaf spring having a rectilinear central section 56 extending through the slot 48 and rectilinear terminal sections 57 engaged partially into slots 36 of separator 35. Central section 56 is joined to terminal sections 56 by oppositely offset curved or takeup portions 58. While illustrated as a substantially flat leaf spring, coupling 50 could just as well be a resilient rod or tube shaped somewhat similarly to the leaf spring and functioning in the same manner. The essential characteristic of the coupling 50 is that it extends diametrically of the assembly and that it is longitudinally flexible in a direction circumferentially of the assembly so that it will serve to absorb torque shocks.

The arrangement operates as follows. Motor output shaft 15 drives inner race 31 of bearing assembly 30. Outer race 32 of this bearing assembly is fixed against rotation. Consequently, balls 33 of bearing assembly 30 are made to revolve around the races at a reduced angular velocity as compared to the angular velocity of shaft 15. Separator 35 also rotates at this reduced angular velocity and, through resilient coupling 50, rotates fan shaft 45 at the reduced velocity.

The reduced output velocity of the arrangement is controllable by the degree of axial pressure applied, through bearing assembly 20, to bearing assembly 30, by virtue of axial thrust spring 25. In accordance with the axial thrust exerted upon shaft 15, the frictional engagement between inner race 31 and balls 33 will be correspondingly varied. This may be made more determinate by, for example, making races 31 and 32 with facing surfaces which converge toward each other outwardly of shaft 15. Also, bearing assembly 30 could be substituted by a roller bearing assembly having tapered rollers.

Spring coupling 55 is a very important feature of the invention. Upon starting of motor 10, this spring absorbs the initial shock on fan 50, by virtue of bending due to curved sections 58. Thus, the starting torque is easily absorbed in the spring coupling without there being a particular strain upon the fan. Furthermore, should the torque exceed a predetermined value, ends 57 of spring 58 will slip out of notches 36 of separator 35 and will thus effectively uncouple the fan from the motor. Upon reduction of the torque, the spring ends 58 will reengage in slots 36, due to continued rotation of separator 35 relative to shaft 45.

It will be noted that the described construction involving bearing assembly 30 acting as a planetary gearing, plus torque absorbing and torque responsive spring coupling 55, provides a very compact speed reducing arrangement whereby a greater torque may be exerted on a fan, such as fan 50, having blades disposed at such an angle as to make a relatively heavy "bite" into the air. There are no parts likely to malfunction with as great a frequency as would be the case with belt drives and the like.

While a specific embodiment of the invention has been shown and described in detail to illustrate the application of the principles of the invention, it will be understood that the invention may be embodied otherwise without departing from such principles.

What is claimed is:

1. A high torque drive for an industrial fan or the like comprising, in combination, a ball bearing assembly including inner and outer races, balls disposed between said races, and a separator operatively associated with said balls and movable therewith; means fixing said outer race against rotation whereby said assembly may function as a planetary gearing; a rotatably supported driving shaft connected to said inner race to rotate the latter; a rotatably supported driven shaft; a load connected to said driven shaft; said separator extending in an axial direction outwardly of said ball bearing assembly toward said driven shaft; and a resilient coupling connecting the axially outer end of said separator to said driven shaft to rotate said driven shaft upon rotation of said driving shaft, said resilient coupling absorbing the shock incident to the initiation of rotation of said driving shaft; said resilient coupling comprising a relatively elongated spring element engaged in a diametrical slot in an end of said driven shaft and having ends engaged in diametrically opposite slots in the axially outer end of said separator; said spring element having a substantially rectilinear central section engaged in the slot in said driven shaft and substantially rectilinear ends extending substantially parallel to said central section and engaged in the slots in said separator; said central section being joined to each end section by a U-shaped bowed offset portion substantially perpendicular to the plane of said central section, and the bowed offset portions extending in opposite directions; said end sections of said spring element being arranged to disengage said slots in said axially outer end of said separator when the torque exceeds a predetermined value, to uncouple said driven shaft from said separator.

2. A high torque drive for an industrial fan comprising, in combination, an electric motor having a housing and a driving shaft; an anti-friction bearing assembly having an inner race secured to said driving shaft to rotate therewith, an outer race fixedly mounted in said housing, anti-friction elements engaged in said races, and a separator engaged with said elements and movable therewith; a driven shaft rotatably mounted in said housing in axially spaced relation to said driving shaft; a fan on the outer end of said driven shaft a resilient shock absorbing coupling between said separator and the inner end of said driven shaft to absorb the starting shock of said motor; and a spring engaged between said housing and a second anti-friction bearing in said housing and engaging a shoulder on said driving shaft, said spring biasing said driving shaft axially into said first-mentioned anti-friction bearing; said separator extending axially from said first-mentioned anti-friction bearing toward the inner end of said driven shaft; said resilient shock absorbing coupling comprising a relatively elongated spring engaged through a substantially diametric slot in the inner end of said driven shaft and having ends engaged in diametrically opposite slots in the axially outer end of said separator; said spring being a leaf spring having U-shaped bowed offset portions, substantially perpendicular to the plane of its central section disposed between its ends and its central section engaged in the diametric slot in said inner shaft; the ends of said leaf spring disengaging the slots in said separator when the torque exceeds a predetermined value.

References Cited in the file of this patent

UNITED STATES PATENTS

| | | |
|---|---|---|
| 1,468,322 | Odom | Sept. 18, 1923 |
| 1,999,543 | Madle | Apr. 30, 1935 |
| 2,209,155 | Fagg | July 23, 1940 |
| 2,528,470 | Elder | Oct. 31, 1950 |
| 3,001,621 | Burns | Sept. 26, 1961 |
| 3,031,866 | Johnson | May 1, 1962 |
| 3,034,377 | Bland | May 15, 1962 |

FOREIGN PATENTS

| | | |
|---|---|---|
| 755,427 | France | Sept. 11, 1933 |
| 820,659 | Germany | Nov. 12, 1951 |